(12) United States Patent
Kim et al.

(10) Patent No.: US 10,210,377 B2
(45) Date of Patent: Feb. 19, 2019

(54) APPARATUS AND METHOD FOR DEVICE ADMINISTRATION USING AUGMENTED REALITY IN ELECTRONIC DEVICE

(71) Applicant: Samsung Electronics Co., Ltd., Gyeonggi-do (KR)

(72) Inventors: Sung-Chul Kim, Gyeonggi-do (KR); Hong-Ryol Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 139 days.

(21) Appl. No.: 14/618,457

(22) Filed: Feb. 10, 2015

(65) Prior Publication Data

US 2015/0228124 A1 Aug. 13, 2015

(30) Foreign Application Priority Data

Feb. 10, 2014 (KR) ........................ 10-2014-0015034

(51) Int. Cl.
*G06K 9/00* (2006.01)
*G06F 3/0481* (2013.01)
*G06F 1/16* (2006.01)
*G06F 3/0346* (2013.01)

(52) U.S. Cl.
CPC ....... *G06K 9/00201* (2013.01); *G06F 1/1686* (2013.01); *G06F 1/1696* (2013.01); *G06F 1/1698* (2013.01); *G06F 3/0346* (2013.01); *G06F 3/04815* (2013.01); *G06F 3/04817* (2013.01); *G06K 9/00671* (2013.01); *G06T 2207/10016* (2013.01); *G06T 2207/10028* (2013.01); *G06T 2207/20212* (2013.01)

(58) Field of Classification Search
None
See application file for complete search history.

(56) References Cited

U.S. PATENT DOCUMENTS

| | | | | |
|---|---|---|---|---|
| 2002/0171763 | A1* | 11/2002 | Stecyk | H04L 12/2805 348/552 |
| 2006/0232499 | A1 | 10/2006 | Ebersole et al. | |
| 2006/0241792 | A1 | 10/2006 | Pretlove et al. | |
| 2008/0238661 | A1* | 10/2008 | Camp | G01S 5/0252 340/539.21 |
| 2009/0316951 | A1* | 12/2009 | Soderstrom | G06F 17/30241 382/103 |
| 2011/0037712 | A1* | 2/2011 | Kim | H04M 1/7253 345/173 |
| 2011/0216179 | A1* | 9/2011 | Dialameh | G06F 17/30247 348/62 |
| 2012/0178431 | A1* | 7/2012 | Gold | H04M 1/7253 455/420 |

(Continued)

OTHER PUBLICATIONS

Inyoung Shin, et al, Augmented Reality Service using Real-Time Device Recognition, 18th International Conference on Telecommunications, 2011, pp. 113-117.*

*Primary Examiner* — James A Thompson
(74) *Attorney, Agent, or Firm* — The Farrell Law Firm, P.C.

(57) ABSTRACT

Methods and apparatuses are provided for operation for an electronic device. Video is output on a display unit of the electronic device. The display unit displays a screen showing a range for device recognition, and displays at least one result of the device recognition corresponding to at least one device.

28 Claims, 26 Drawing Sheets

(56) References Cited

U.S. PATENT DOCUMENTS

| | | | | |
|---|---|---|---|---|
| 2015/0133155 A1* | 5/2015 | Jordan | ................... | H04W 4/80 |
| | | | | 455/456.1 |
| 2015/0332368 A1* | 11/2015 | Vartiainen | ............... | H04W 4/21 |
| | | | | 705/26.61 |
| 2016/0217617 A1* | 7/2016 | Barribeau | ........... | G06F 3/04815 |
| 2017/0185276 A1* | 6/2017 | Lee | .................... | G06F 3/04847 |

* cited by examiner

APPARATUS AND METHOD FOR DEVICE ADMINISTRATION USING AUGMENTED REALITY IN ELECTRONIC DEVICE

PRIORITY

This application claims priority under 35 U.S.C. § 119(a) to an application filed in the Korean Intellectual Property Office on Feb. 10, 2014 and assigned Ser. No. 10-2014-0015034, the content of which is incorporated herein by reference.

BACKGROUND OF THE INVENTION

1. Field of the Invention

The present invention relates generally to device administration.

2. Description of the Related Art

Network management involves the monitoring and managing of data communication system use, and of constructions, states, and the like, of various communication resources within the data communication system, for the purpose of effective use, facilities maintenance, and quality maintenance of a communication network. Network management includes network control other than traffic management, quality maintenance, and preservation management. The function of network management largely includes concentration and distribution of network management, and automatic fault detection and recovery. Network management in a Local Area Network (LAN) includes network operation, use, management, construction management, documentation and training, database management, planning and security, and the like.

A device manager manages devices using a device management tool in a terminal that is connected with the devices that are intended to be managed. The device manager can directly select a name of the device intended to be managed in a device list of the device management tool, or can search for the device by device type or device number and an Internet Protocol (IP) address, and select the device. A typical example of the device management tool is a tree view. Referring to FIG. 1, the tree view includes search windows 101 and 103 in which the device manager can directly input a name or identification number of a device intended to be managed and search for the device. Summary information 105 includes all devices connected to the terminal and a list 107 provides the devices that have been registered in a tree structure.

SUMMARY OF THE INVENTION

The present invention has been made to address at least the above problems and/or disadvantages and to provide at least the advantages described below. Accordingly, an aspect of the present invention provides an apparatus and a method for recognizing and managing a device located within a short distance in an electronic device.

Another aspect of the present invention provides an apparatus and a method for recognizing and managing a device located a long distance away in an electronic device.

An additional aspect of the present invention provides an apparatus and a method for recognizing and managing a device using an electronic map in an electronic device.

According to an aspect of the present invention, an electronic device is provided that includes a display unit configured to output video. The electronic device also includes a control unit configured to control the display unit to display a screen showing a range for device recognition, and to display at least one result of the device recognition corresponding to at least one device.

According to another aspect of the present invention, a method of operation for an electronic device is provided. Video is output on a display unit of the electronic device. The display unit displays a screen showing a range for device recognition, and displays at least one result of the device recognition corresponding to at least one device.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE PRESENT INVENTION

Figure 1:
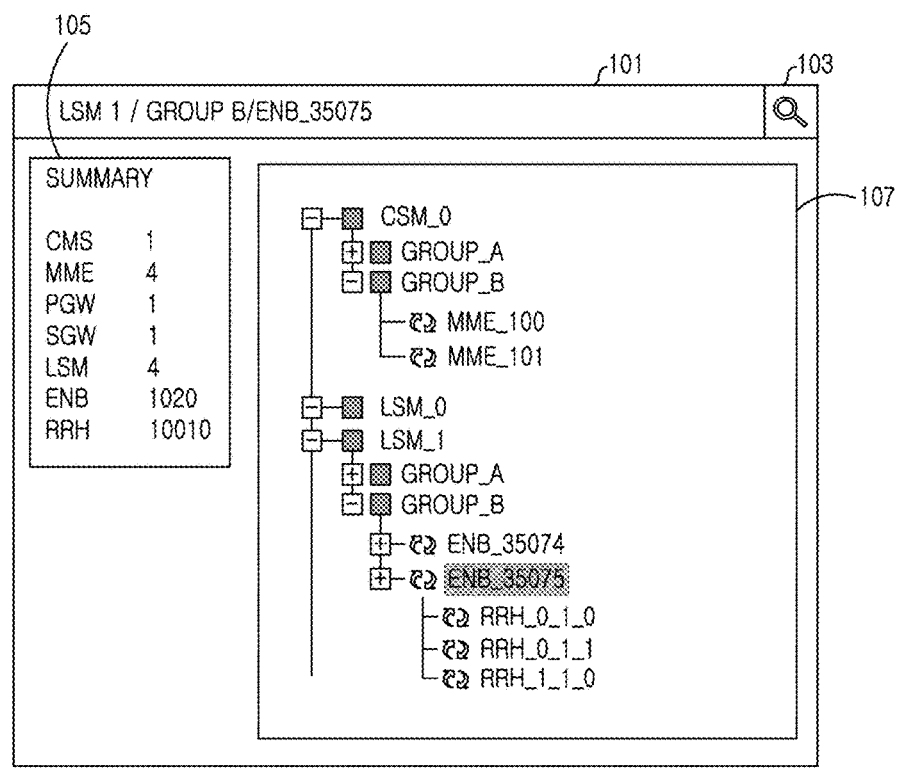
FIG. 1 is diagram illustrating a tree view for managing devices.

Embodiments the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Terms described below, which are defined considering functions in the present invention, may be modified in accordance to user and operator's intention or practice. Therefore, the definition should be given on the basis of the content herein.

Embodiments of the present invention describe technology for recognizing a device in an electronic device. Embodiments of the present invention describe an apparatus and a method for device administration using augmented reality in an electronic device FIG. 2 is a diagram illustrating communication of an electronic device and devices, according to an embodiment of the present invention.

Figure 2:
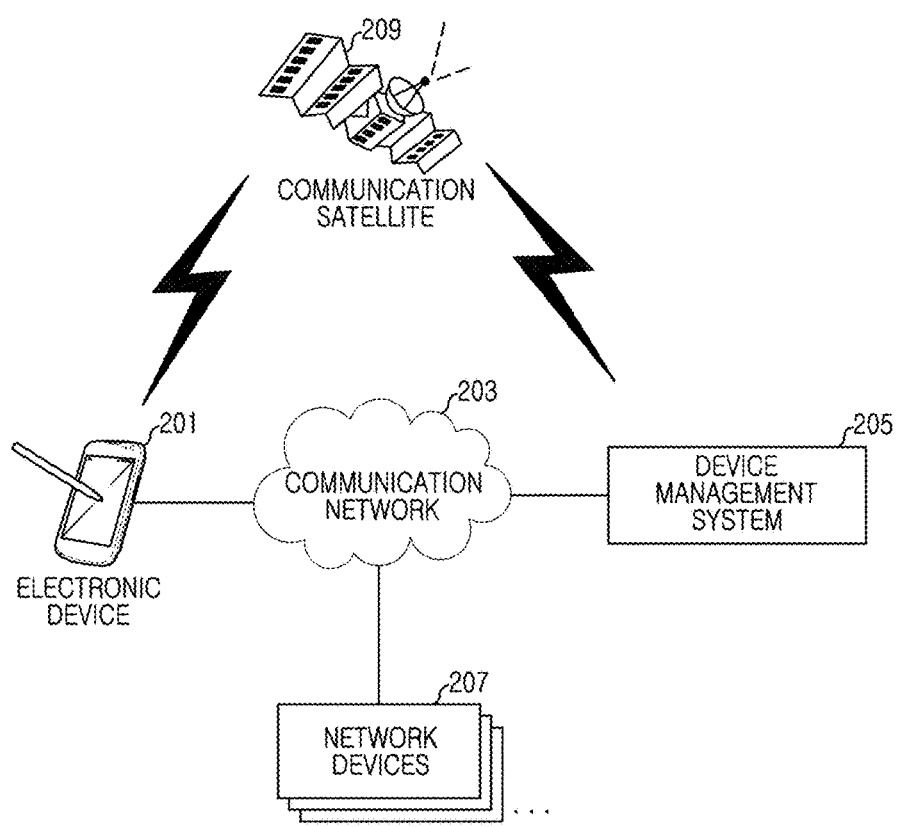
FIG. 2 is a diagram illustrating communication of an electronic device and devices, according to an embodiment of the present invention.

Referring to FIG. 2, a system for device recognition includes an electronic device 201, a communication network 203, a device management system 205, network devices 207, and a communication satellite 209.

The electronic device 201 is connected to the device management system 205 and the network devices 207 through the communication network 203. The device management system 205 has information about the network devices 207 connected to the device management system 207. The communication satellite 209 is connected with the electronic device 201 and the network devices 207 by satellite communication. The electronic device 201 may acquire position information of the electronic device 201 through the communication satellite 209 and a Global Positioning System (GPS) sensor of the electronic device 201. The electronic device 201 may be a portable electronic device. In detail, the electronic device 201 may be embodied as one of a smart phone, a portable terminal, a mobile phone, a mobile pad, a media player, a tablet computer, a handheld computer, and a Personal Digital Assistant (PDA), and may also be embodied as a device that combines functions of two or more of the aforementioned devices.

The network devices 207 may include a Remote Radio Head (RRH), an enhanced Node B (eNB), and a Mobility Management Entity (MME). The RRH is a device separating a wireless unit from a control unit of the eNB and installing and using the wireless unit in indoor and outdoor environments in $3^{rd}$ Generation (3G) and $4^{th}$ Generation (4G) mobile communication networks. Several RRHs are installed and a communication service provided, thereby attempting to decrease a call drop rate and increase data throughput of the eNB. The eNB represents a base station. The RRH is connected with the eNB and exchanges data with the MME. The MME takes charge of signal control of the eNB and determines where to route data inputted from a terminal.

The network devices 207 may include a communication device, a power related device, electric home appliances, a water and sewage related device, a road related device, and the like. Also, the network devices 207 may further include various devices installed in industrial facilities such as, for example, a power plant, an iron mill, an automotive plant, a chemical industrial complex, and the like.

Figure 3:
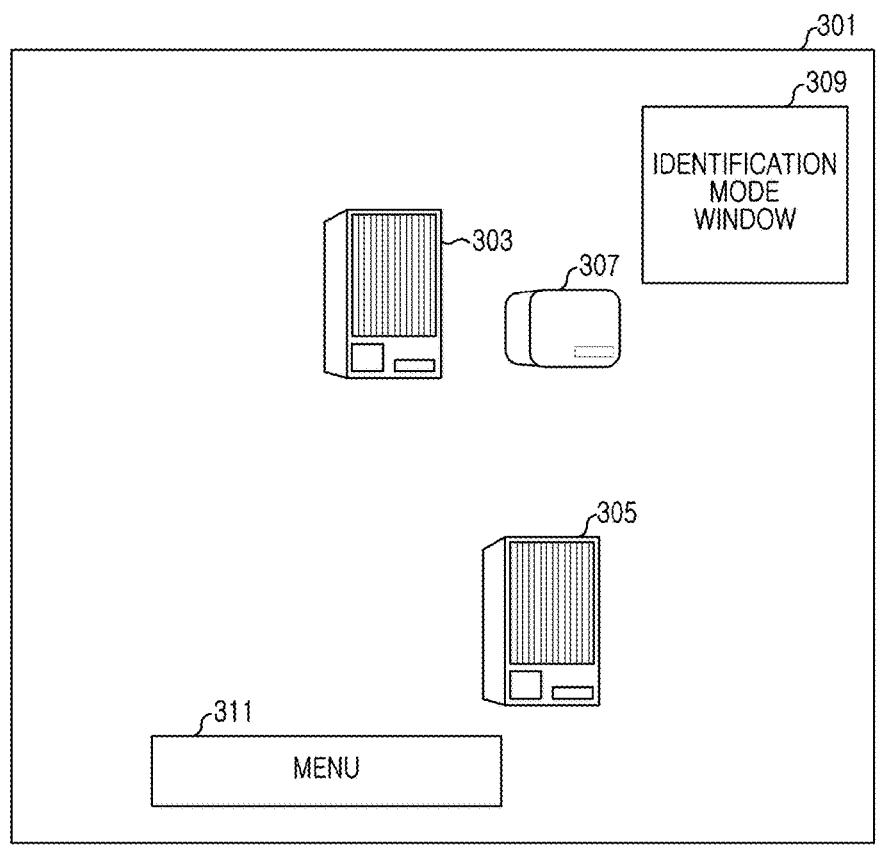
FIG. 3 is a diagram illustrating video information of a short-distance recognition mode in an electronic device, according to an embodiment of the present invention.

FIG. 3 is a diagram illustrating video information of a short-distance recognition mode in an electronic device, according to an embodiment of the present invention. The short-distance recognition mode is usable in a situation in which a device intended to be managed and controlled is located within a visual range of a user.

Referring to FIG. 3, the electronic device displays video information 301 that is recognized at a short distance through a camera of the electronic device. The video information 301 includes appearance images 303, 305, and 307 of devices recognized by the camera of the electronic device. The electronic device overlaps and displays an identification mode window 309 for determining a device identification method, and a menu 311 for filtering the kind of device, on the displayed video information 301.

Figure 4:
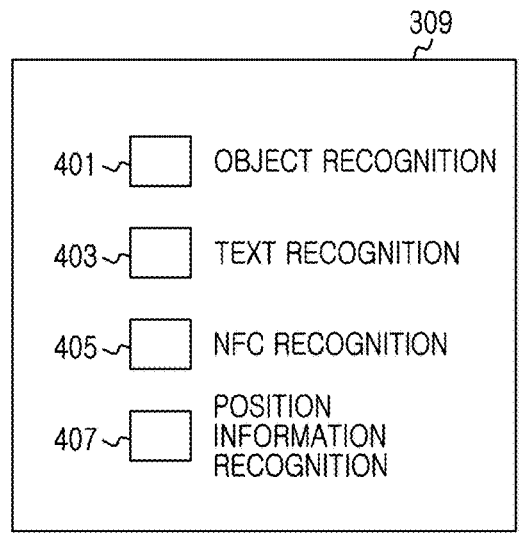
FIG. 4 is a diagram illustrating an identification mode window of a short-distance recognition mode in an electronic device, according to an embodiment of the present invention.

FIG. 4 is a diagram illustrating an identification mode window of a short-distance recognition mode in an electronic device, according to an embodiment of the present invention.

Referring to FIG. 4, an identification mode window 309 includes an object recognition mode 401, a text recognition mode 403, a Near Field Communication (NFC) recognition mode 405, and a position information recognition mode 407. In the object recognition mode 401, the electronic device recognizes an appearance image of a device, thereby recognizing the device. In the text recognition mode 403, the electronic device recognizes text, such as a name tag, an Augmented Reality (AR) marker, a Quick Response (QR) code, a bar code, and the like, attached to the device, thereby recognizing the device. In the NFC recognition mode 405, the electronic device recognizes an NFC attached to the device, thereby recognizing the device. In the position information recognition mode 407, if the device is not recognized in the object recognition, text recognition, and NFC recognition methods, the electronic device selects at least one of devices existing nearby based on a user position, thereby recognizing the selected device. In accordance with another embodiment of the present invention, in the position information recognition mode 407, the electronic device enables the user to directly input position information of a device intended to be recognized, thereby recognizing the device. The NFC, which is an electronic tag, refers to a technology of transmitting data between terminals at a short distance of 10 centimeters (cm) by a non-contact short-distance wireless communication module, using a frequency band of 13.56 Mega Hertz (MHz).

In accordance with another embodiment of the present invention, the electronic device may further support other identification methods capable of processing through other visual processes, in addition to the aforementioned object recognition, text recognition, NFC recognition, and position information recognition methods.

Figure 5:
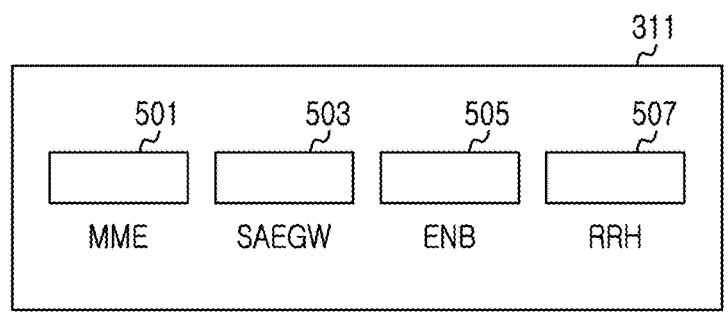
FIG. 5 is a diagram illustrating a menu for selecting the kind of device intended to be recognized in an electronic device, according to an embodiment of the present invention.

FIG. 5 is a diagram illustrating a menu for selecting the kind of device that is intended to be recognized in an electronic device, according to an embodiment of the present invention.

Referring to FIG. 5, a menu 311 displays an MME filtering icon 501, a System Architecture Evolution (SAE) GateWay (SAEGW) filtering icon 503, an eNB filtering icon 505, and an RRH filtering icon 507.

The menu 311 provides a user with a function of filtering the kind of device that is to be recognized by the electronic device. For example, if the user selects the MME filtering icon 501, the electronic device filters and displays only MME devices on video information of the electronic device.

In FIG. 5, an example of a communication network related device is illustrated, but filtering of a power related device and an industrial facility internal device, not the communication device, is also possible. For example, when the electronic device recognizes a metering device within industrial facilities, filtering of a temperature metering device, a pressure metering device, a flow rate metering device, a water level metering device, and the like, is possible.

Figure 6:
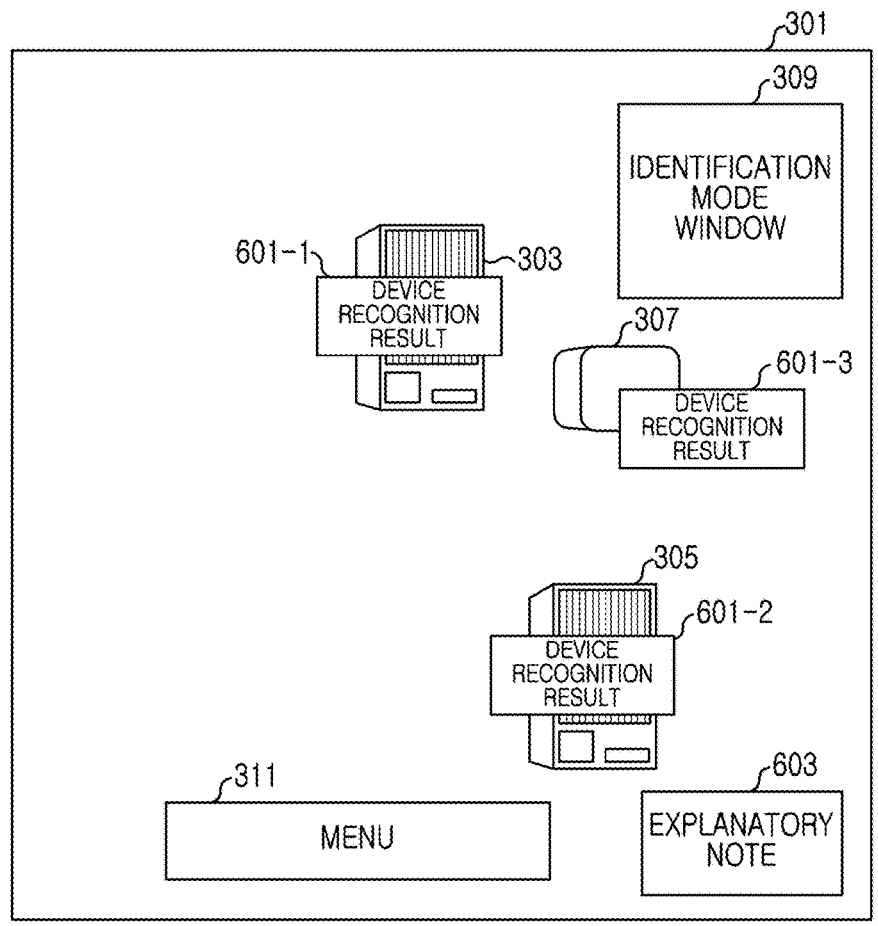
FIG. 6 is a diagram illustrating a device recognition result of a short-distance recognition mode in an electronic device, according to an embodiment of the present invention.

FIG. 6 is a diagram illustrating a device recognition result of a short-distance recognition mode in an electronic device, according to an embodiment of the present invention.

Referring to FIG. 6, the electronic device displays the video information 301 recognized through the camera of the electronic device. The video information 301 includes the appearance images 303, 305, and 307 of devices. The electronic device overlaps and displays the identification mode window 309, the menu 311, device recognition results 601-1 to 601-3, and an explanatory note 603 on the video information 301. In order to overlap and display, the electronic device checks if the appearance images 303, 305, and 307 of the devices match images of devices previously registered to the devices management system, which is connected with the electronic device through the communication network. Specifically, the electronic device checks whether the previously registered devices match the appearance images 303, 305, and 307. The electronic device overlaps and displays on the video information 301 of the electronic device the device recognition results 601-1 to 601-3 and explanatory note 603 according whether the matches exist.

Figure 7:
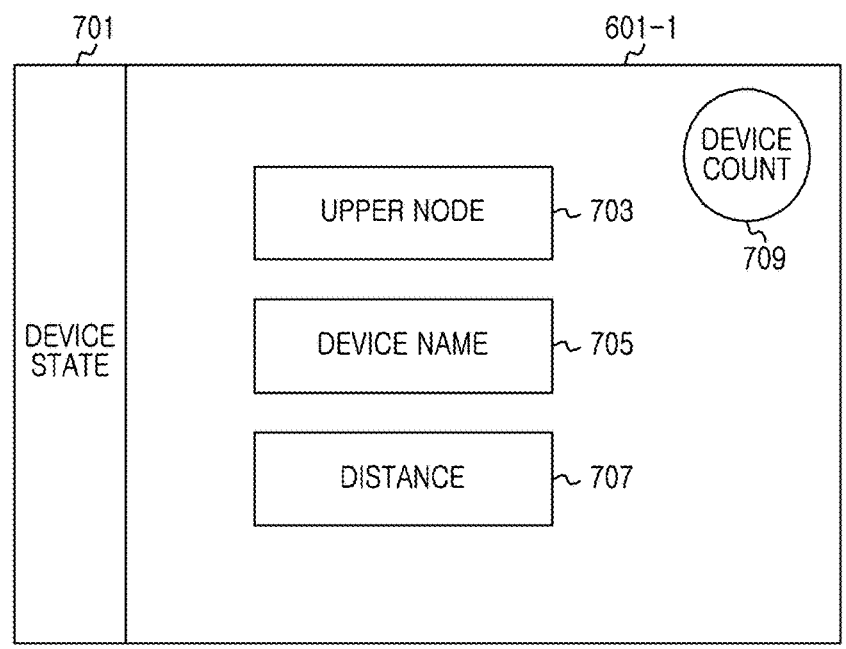
FIG. 7 is a diagram illustrating a device recognition result in an electronic device, according to an embodiment of the present invention.

FIG. 7 is a diagram illustrating a device recognition result in an electronic device, according to an embodiment of the present invention.

Referring to FIG. 7, if a device is recognized, the electronic device overlaps and displays the device recognition result 601-1 on the device image 303 of the video information 301 of the electronic device. The device recognition result 601-1 displays a device state 701, an upper node 703, a device name 705, a distance 707, and a device count 709.

The device state 701 may be marked with a predefined color corresponding to the device state 701. For example, a device needing attention may be marked with red, a fault device with black, a major device with green, a non-major device with yellow, and a normal device with blue. In another example, the device state 701 may be marked with text, a symbol, and the like, and not color. The upper node 703 represents a name of the upper node 703 connected with the device. The device name 705 represents a name of the device recognized by the electronic device. The distance 707 represents a distance between the recognized device and the electronic device. If the device and other devices are located such that they overlap with each other, the device count 709 displays the number of overlapped devices. For example, if no devices are overlapped with the device, the device count 709 is not marked, and if there are two overlapped devices, the device count is marked with "2". In accordance with another embodiment of the present invention, if no devices are overlapped with the device, the device count 709 may be marked with "1".

Figure 8:
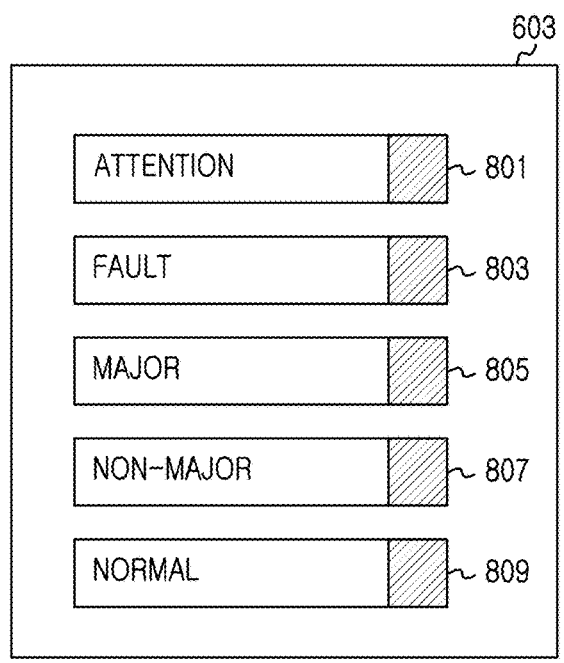
FIG. 8 is a diagram illustrating an explanatory note in an electronic device, according to an embodiment of the present invention.

FIG. 8 is a diagram illustrating an explanatory note in an electronic device, according to an embodiment of the present invention.

Referring to FIG. 8, the explanatory note 603 assigns a color to a device state. For example, a device needing attention is marked with red 801, a fault device with black 803, a major device with green 805, a non-major device with yellow 807, and a normal device with blue 809. In another example, the explanatory note 603 assigns text, a symbol and the like, and not color.

Figure 9:
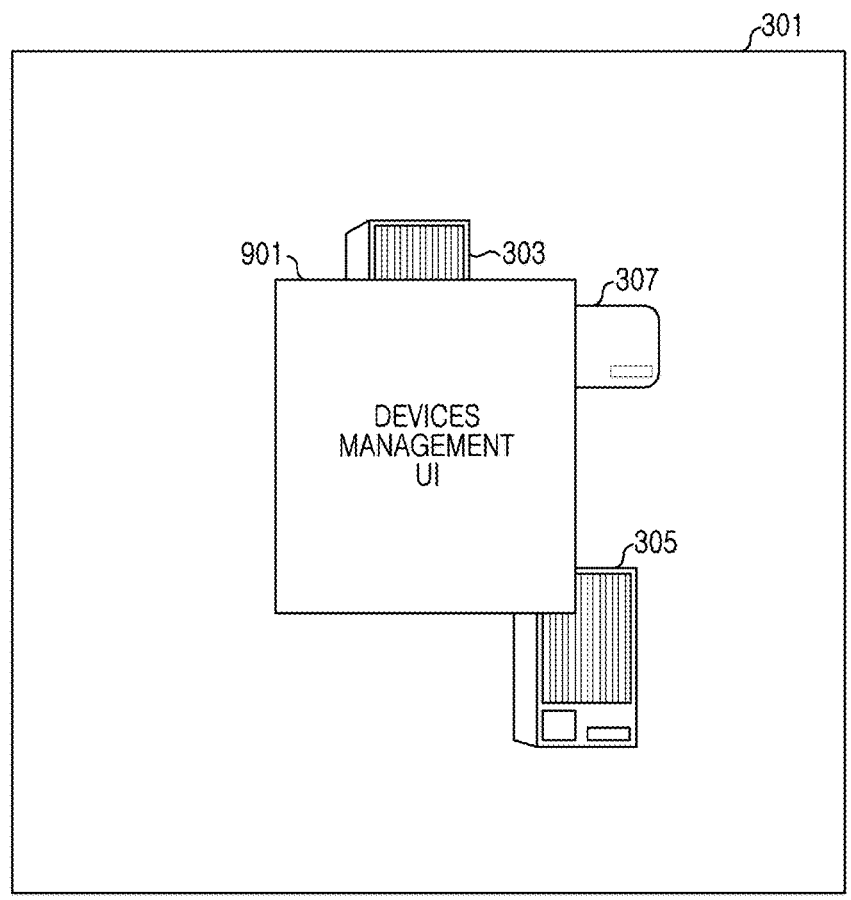
FIG. 9 is a diagram illustrating overlapping of a device management User Interface (UI) in an electronic device, according to an embodiment of the present invention.

FIG. 9 is a diagram illustrating overlapping of a device management UI in an electronic device, according to an embodiment of the present invention.

Referring to FIG. 9, if a user selects at least one device recognition result, the electronic device removes the device recognition results from the video information 301 of the electronic device. The electronic device overlaps and displays a device management UI 901 corresponding to the selected device recognition result on the video information 301 of the electronic device. The device management UI 901 provides real-time information about a device and an interface through which the user may manage the device.

In FIG. 9, if the device recognition result is selected, a menu and an identification mode window are removed. However, in accordance with another embodiment of the present invention, although the device recognition result is selected, at least one of the menu and the identification mode window may remain displayed.

Figure 10:
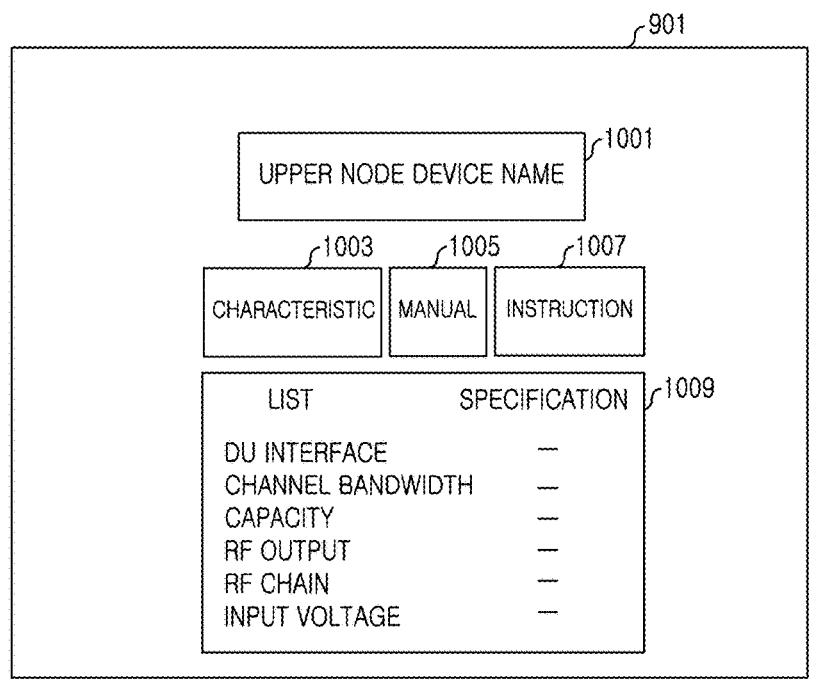
FIG. 10 is a diagram illustrating construction of a device management UI in an electronic device, according to an embodiment of the present invention.

FIG. 10 is a diagram illustrating a construction of a device management UI in an electronic device, according to an embodiment of the present invention.

Referring to FIG. 10, the device management UI 901 includes an upper node and device name 1001, a characteristic icon 1003, a manual icon 1005, an instruction icon 1007, and specification information 1009.

The upper node and device name 1001 represents a name of a device selected by a user and a name of an upper node connected with the device. However, if the upper node does not exist, the name of the upper node may be excluded.

The characteristic icon 1003 is an icon for checking a characteristic of the device. If the user selects the characteristic icon 1003, the electronic device displays a menu capable of checking the characteristic of the device. The user may check an installation history of the device and the like through the characteristic icon 1003.

The manual icon 1005 is an icon for checking a manual of the device. If the user selects the manual icon 1005, the electronic device displays a menu capable of checking the manual of the device. The manual may support one or more languages.

The instruction icon 1007 is an icon for supporting a function of inputting an instruction for various device settings. If the user selects the instruction icon 1007, the electronic device may display a menu capable of managing the device through various device settings.

The specification information 1009 displays specification information of the device. In FIG. 10, the specification information 1009 includes a channel bandwidth of the device, a capacity thereof, a Radio Frequency (RF) output thereof, an RF chain thereof, an input voltage thereof, and the like. Items displayed in the specification information 1009 may differ based on the embodiment of the present invention. In FIG. 10, an example of a network device is illustrated, but the specification information 1009 may be expressed in accordance with the characteristic and kind of the network device.

Figure 11:
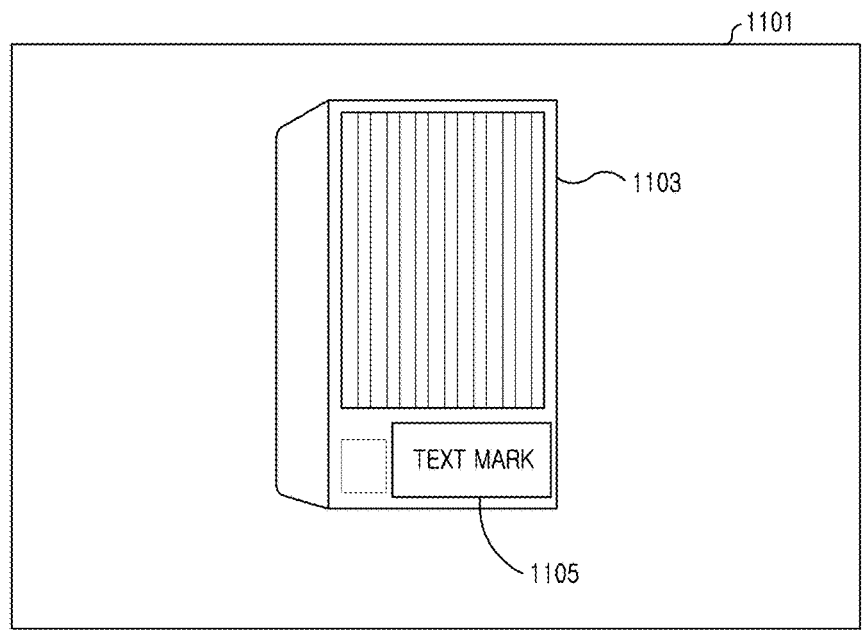
FIG. 11 is a diagram illustrating a short-distance recognition mode in an electronic device, according to an embodiment of the present invention.

FIG. 11 is a diagram illustrating a short-distance recognition mode in an electronic device, according to an embodiment of the present invention.

Referring to FIG. 11, video information 1101 recognized through the camera of the electronic device includes a device image 1103 recognized through the camera of the electronic device, and a text mark 1105 of a device.

If the electronic device is located at a distance close enough to recognize the text mark 1105 of the device or an NFC thereof, the electronic device recognizes the text mark 1105 of the device through the camera of the electronic device or recognizes the NFC through a sensor of the electronic device. In order to perform this recognition, the electronic device determines whether the text mark 1105 recognized by the electronic device matches a text mark previously registered in the device management system. If there is a match, the electronic device acquires information of the device from the device management system and overlaps and displays a device recognition result acquired through the text mark 1105 on the video information 1101 in accordance with the description of FIGS. 6 and 7 provided above.

The text mark 1105 may be one of several marks recognizable by the electronic device, which include, for example, a name tag, an AR marker, a QR code, a bar code and the like. The NFC, which is an electronic tag, refers to the technology of transmitting data between terminals at a short distance of 10 cm by a non-contact short-distance wireless communication module using a frequency band of 13.56 MHz.

In accordance with an embodiment of the present invention, the electronic device may also support other identification methods capable of processing through other visual processes, in addition to the aforementioned object recognition, text recognition, NFC recognition, and position information recognition methods.

If a user selects the device recognition result, the electronic device overlaps and displays the device management UI for the device on the video information 1101 of the electronic device, in accordance with the description of FIG. 10 provided above.

Figure 12:
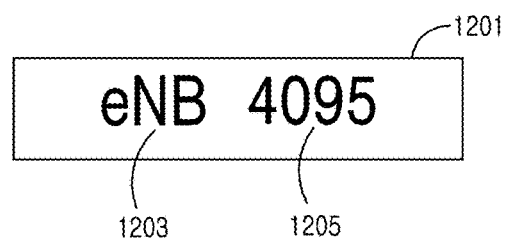
FIG. 12 is a diagram illustrating a name tag, according to an embodiment of the present invention.

FIG. 12 is a diagram illustrating an example of a name tag, according to an embodiment of the present invention.

Referring to FIG. 12, a name tag 1201 includes English text 1203 and numeral 1205 for distinguishing the device to which the name tag 1201 is attached. The name tag 1201 is recognized by the electronic device through the camera of the electronic device. Accordingly, the electronic device recognizes a device corresponding to the name tag 1201 from the device management system that is connected with the electronic device by the communication network. The electronic device displays a device recognition result on video information.

Figure 13:
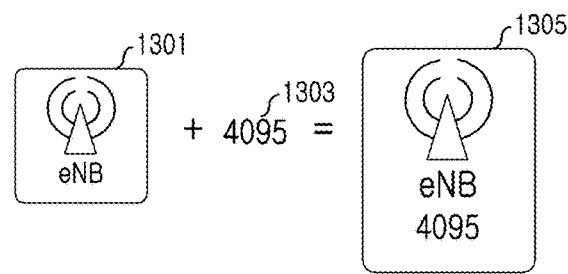
FIG. 13 is a diagram illustrating an Augmented Reality (AR) marker, according to an embodiment of the present invention.

FIG. 13 is a diagram illustrating an AR marker, according to an embodiment of the present invention.

Referring to FIG. 13, an AR marker 1305 is comprised of image 1301 and number 1303 for distinguishing the device to which the AR marker 1305 is attached. The electronic device recognizes the AR marker 1305 through the image 1301 and the number 1303 of the device.

Figure 14:
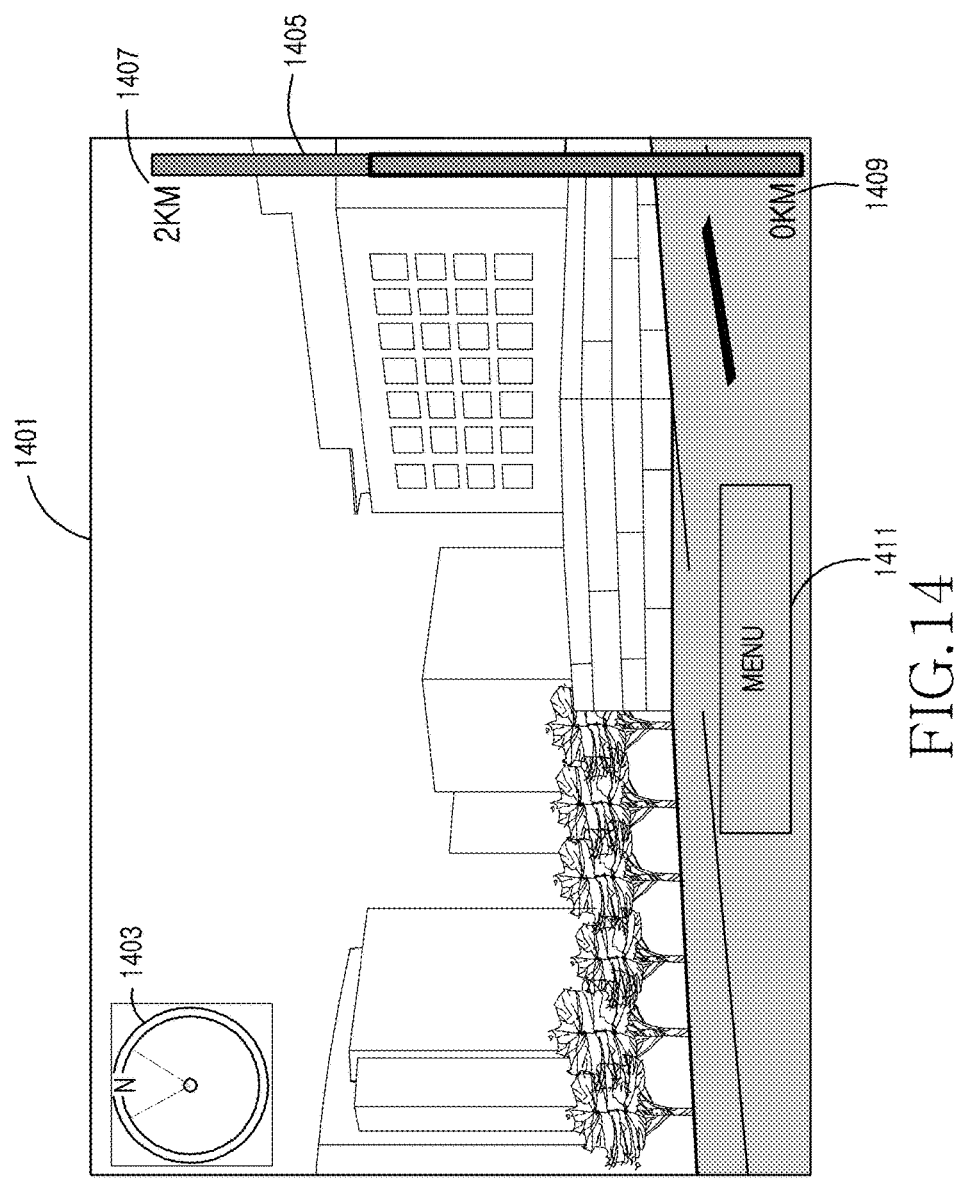
FIG. 14 is a diagram illustrating video information of a long-distance recognition mode in an electronic device, according to an embodiment of the present invention.

FIG. 14 is a diagram illustrating video information of a long-distance recognition mode in an electronic device, according to an embodiment of the present invention. The long-distance recognition mode is usable when a device that is intended to be managed and controlled is located out of visual range of the user.

Referring to FIG. 14, the electronic device displays video information 1401 recognized through the camera of the electronic device, a RAdio Detecting And Ranging (RADAR) 1403 showing positions of devices existing within a device recognizable range of the electronic device, a meter 1405 indicating a maximum value 1407 and minimum value 1409 of the device recognizable range of the electronic device, and a menu 1411.

In FIG. 14, if a user points the camera of the electronic device in a direction intending to find a device, the video information 1401 recognized by the camera of the electronic device is outputted to a screen module of the electronic device. The electronic device checks devices located within a camera shooting range and the range of the maximum value 1407 and minimum value 1409 set through the meter 1405. The user may set the device recognizable range using the maximum value 1407 and minimum value 1409 of the meter 1405.

The menu 1411 provides a user with a function of filtering the kind of device to be recognized by the electronic device. For example, as shown in FIG. 5, if the user selects the MME filtering icon, the electronic device filters and displays only MME devices on video information of the electronic device.

Figure 15:
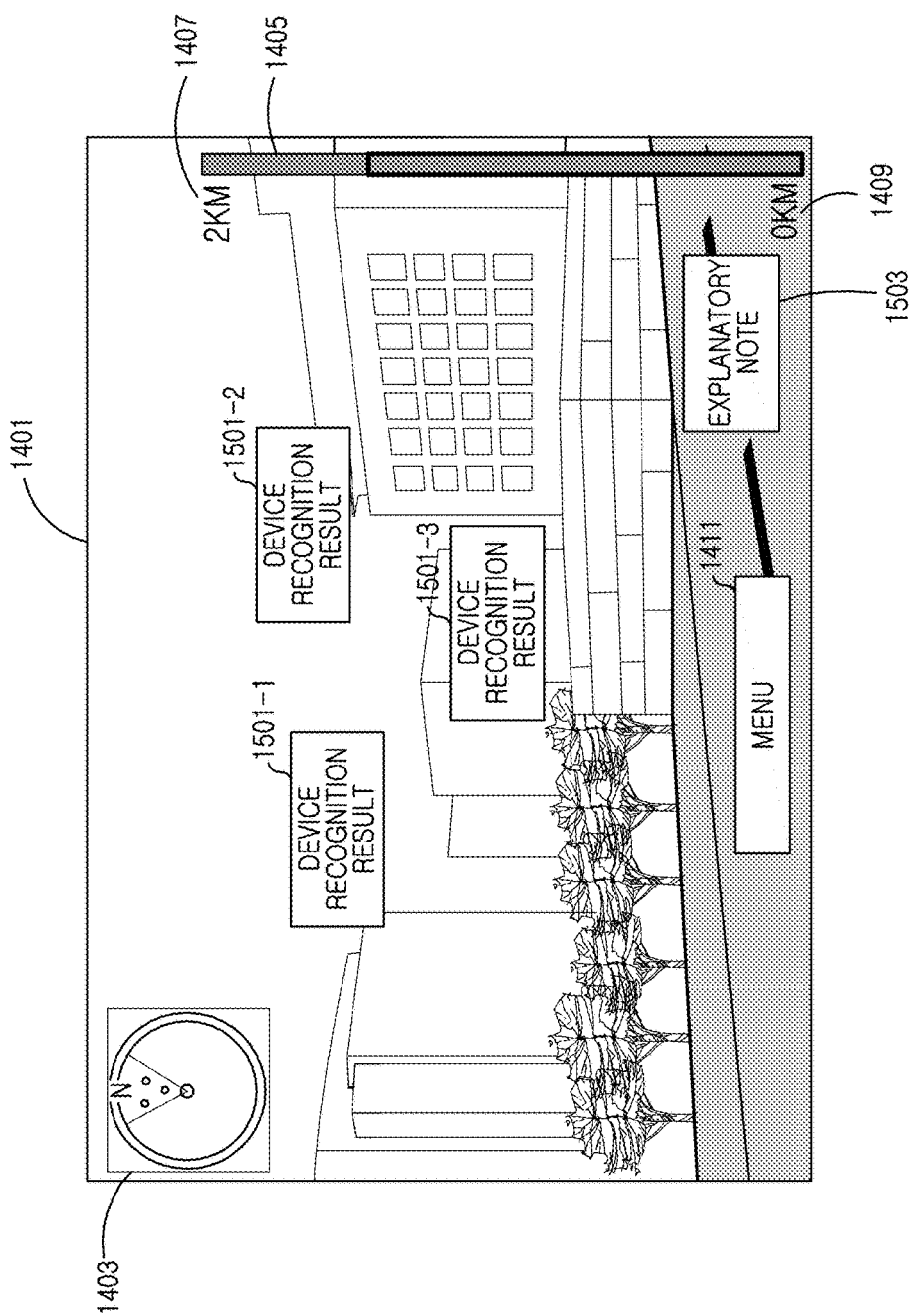
FIG. 15 is a diagram illustrating a device recognition result of a long-distance recognition mode, according to an embodiment of the present invention.

FIG. 15 is a diagram illustrating a device recognition result of a long-distance recognition mode, according to an embodiment of the present invention.

Referring to FIG. 15, the electronic device overlaps and displays the RADAR 1403 showing positions of devices existing within a device recognizable range of the electronic device, device recognition results 1501-1 to 1501-3, the meter 1405 indicating the maximum value 1407 and the minimum value 1409 of the device recognizable range of the electronic device, the menu 1411, and an explanatory note 1503, on the video information 1401.

In FIG. 15, the electronic device determines whether devices are located within a camera shooting range and the range of the maximum value 1407 and minimum value 1409 set through the meter 1405. The electronic device overlaps and displays the device recognition results 1501-1 to 1501-3 of the devices on the video information 1401.

The device recognition result includes a device state, an upper node, a device name, a distance, and a device count. If the electronic device recognizes the device, the electronic device overlaps and displays the device recognition result on a device image of the video information, in accordance with the description of FIGS. 6 and 7 provided above.

The explanatory note 1503 assigns colors to the device states, in accordance with the description of FIG. 8 provided above.

Figure 16:
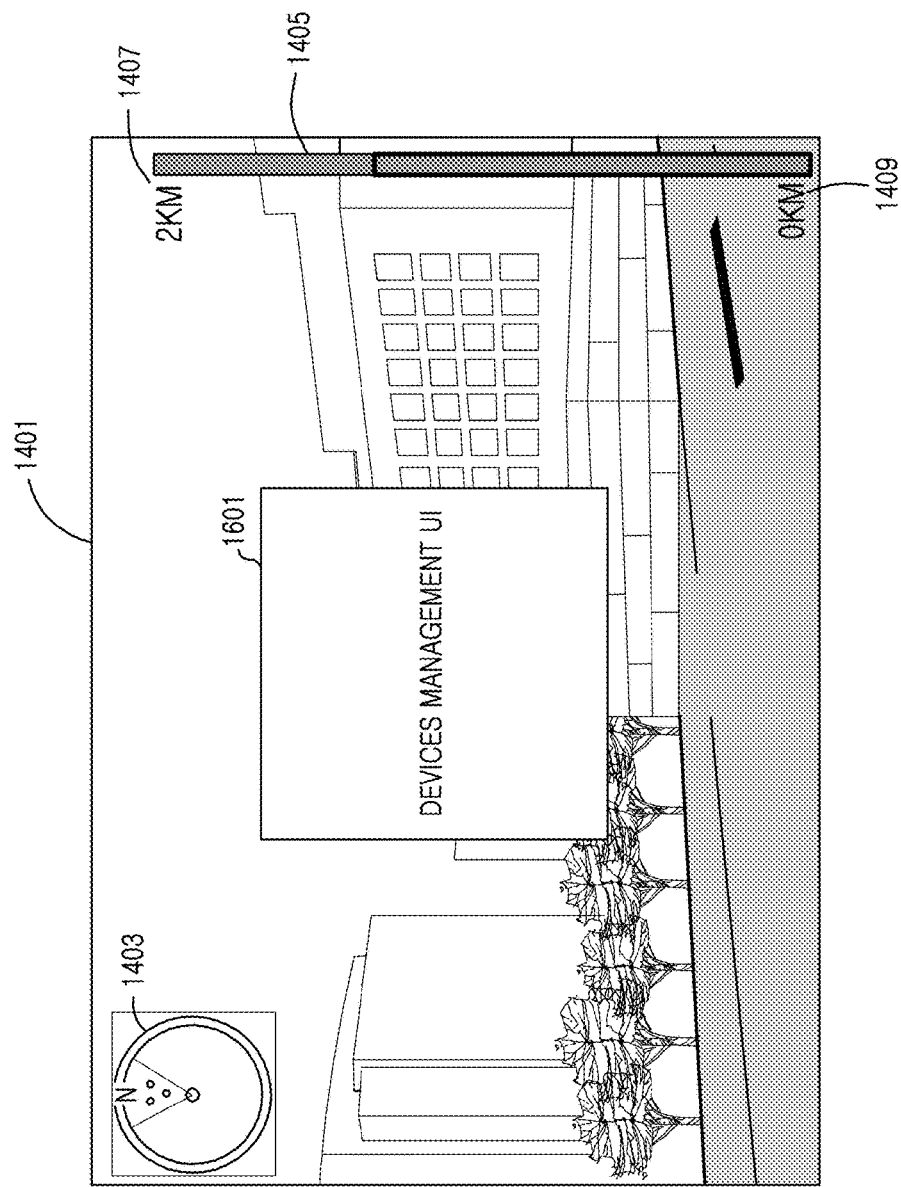
FIG. 16 is a diagram illustrating overlapping and displaying of a device management UI in a long-distance recognition mode of an electronic device, according to an embodiment of the present invention.

FIG. 16 is a diagram illustrating overlapping and displaying of a device management UI in a long-distance recognition mode of an electronic device, according to an embodiment of the present invention.

Referring to FIG. 16, if a user selects at least one of the device recognition results, the device recognition results, the menu, and the explanatory note are removed. The electronic device overlaps and displays a device management UI 1601 for a device on the video information 1401 of the electronic device. The device management UI 1601 provides real-time information about the device and an interface through which the user may manage the device, in accordance with the description of FIG. 10 provided above.

In FIG. 16, the device recognition results, the menu, and the explanatory note are removed, however, in accordance with another embodiment of the present invention, at least one of the device recognition result, the menu, and the explanatory note may remain displayed.

Figure 17:
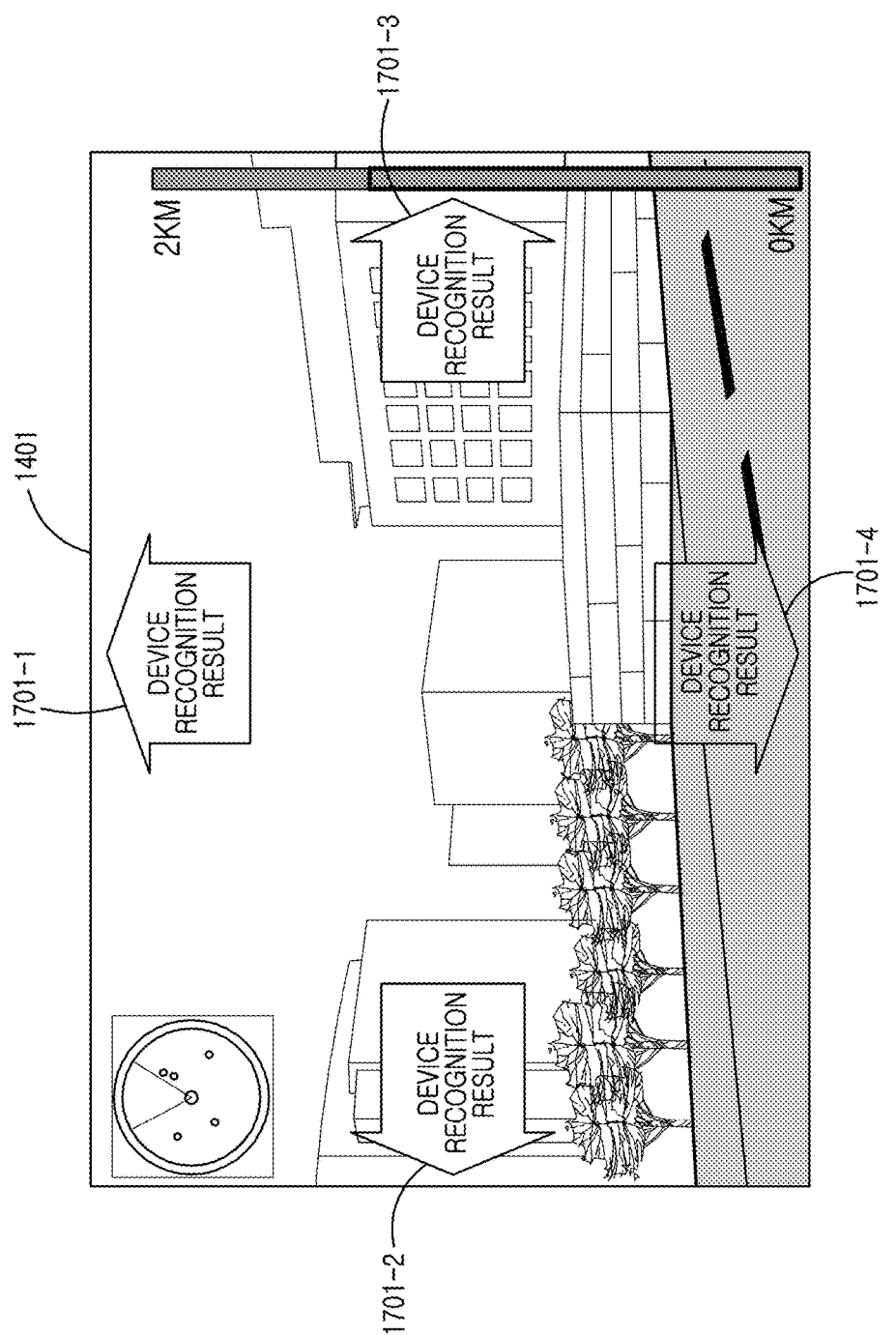
FIG. 17 is a diagram illustrating a device recognition result when a device that a user searches in a long-distance recognition mode is located out of a camera shooting range of an electronic device in the electronic device, according to an embodiment of the present invention.

FIG. 17 is a diagram illustrating a device recognition result when a device for which a user searches in a long-distance recognition mode is located out of a camera shooting range of an electronic device in the electronic device, according to an embodiment of the present invention.

The user may directly search for a device in the electronic device. Referring to FIG. 17, if the searched device is not within the camera shooting range of the electronic device based on a position of the electronic device and a camera view direction thereof, the electronic device overlaps and displays device recognition results 1701-1 to 1701-4 on the video information 1401 based on the position of the electronic device. For example, if the closest device is located left of a direction that the camera faces, the device recognition result 1701-2 is displayed at the left side of the video information 1401. The device recognition results 1701-1 to 1701-4 may include names of the devices and names of upper nodes. However, if the upper node does not exist, the name of the upper node may be excluded.

Figure 18:
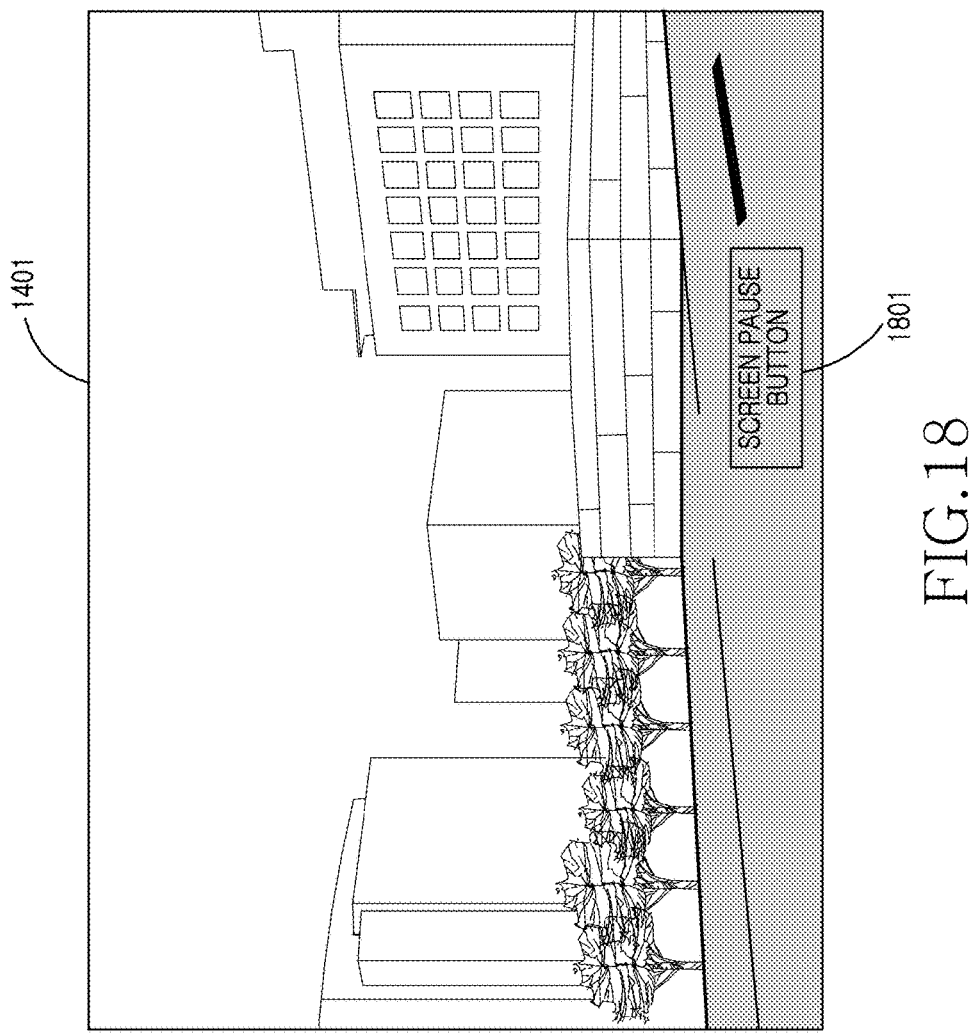
FIG. 18 is a diagram illustrating video information of a long-distance recognition mode in an electronic device, according to another embodiment of the present invention.

FIG. 18 is a diagram illustrating video information of a long-distance recognition mode in an electronic device, according to another embodiment of the present invention.

Referring to FIG. 18, the electronic device displays the video information 1401 of the electronic device and a screen pause button 1801. The screen pause button 1801 may be denoted as a freeze button. The screen pause button 1801 is a button for pausing the video information 1401 of the electronic device irrespective of a movement of the electronic device. Specifically, if a user holds the electronic device by hand, the video information 1401 may flicker due to a user's motion. Concurrently with the movement of the electronic device, a device recognition result displayed on the video information 1401 of the electronic device may flicker on the video information 1401. Due to this, the user may have difficulty selecting the device recognition result. If the user selects the screen pause button 1801, the electronic device pauses the video information 1401 of the electronic device irrespective of the movement of the electronic device. Specifically, although the camera of the electronic device is moved in a specific direction, the video information 1401 is kept in a fixed state. The user may then select the device recognition result displayed on the paused video information 1401 and check a device management UI corresponding to the device recognition result.

In accordance with another embodiment of the present invention, the screen pause button 1801 may be applied to the short-distance recognition mode as well as the long-distance recognition mode.

Figure 19:
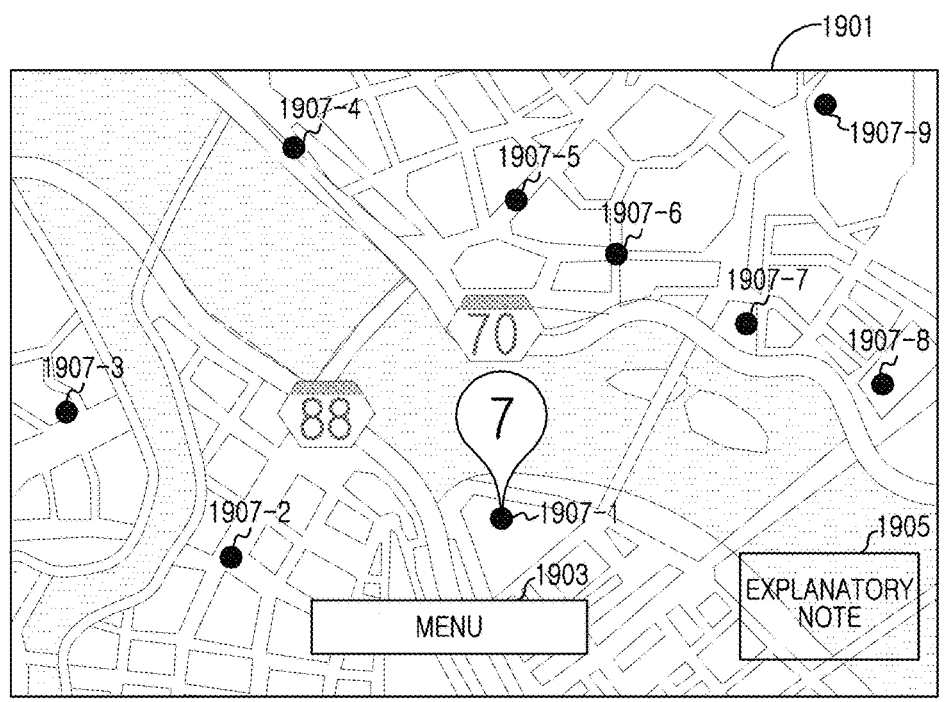
FIG. 19 is a diagram illustrating a device recognition result in a map recognition mode of an electronic device, according to an embodiment of the present invention.

FIG. 19 is a diagram illustrating a device recognition result in a map recognition mode of an electronic device, according to an embodiment of the present invention. The map recognition mode represents a mode for managing and controlling devices existing within an electronic map range.

Referring to FIG. 19, an electronic map 1901 displays a menu 1903, an explanatory note 1905, and device recognition results 1907-1 to 1907-9.

The electronic device displays on the electronic map 1901 the device recognition results 1907-1 to 1907-9 representing recognized devices existing within a range of the electronic map 1901. Through the menu 1903, a user may filter the kind of device to be displayed on the electronic map 1901, in accordance with the description of FIG. 5 provided above. Also, with reference to the explanatory note 1905, the user may check states of the recognized devices by color of the device recognition results 1907-1 to 1907-9 displayed on the electronic map 1901, in accordance with the description of FIG. 8 provided above.

In FIG. 19, the device recognition results 1907-1 to 1907-9 are marked with the number of devices overlapped in areas in which the device recognition results are located. For example, if the number of devices overlapped in the device recognition result 1907-1 is seven, the device recognition result 1907-1 is marked with a numeral "7". In accordance with another embodiment of the present invention, if the devices overlapped with the device are seven, the device recognition result 1907-1 may be also marked with "8" adding the device count "1" and the number "7" of the overlapped devices.

Figure 20:
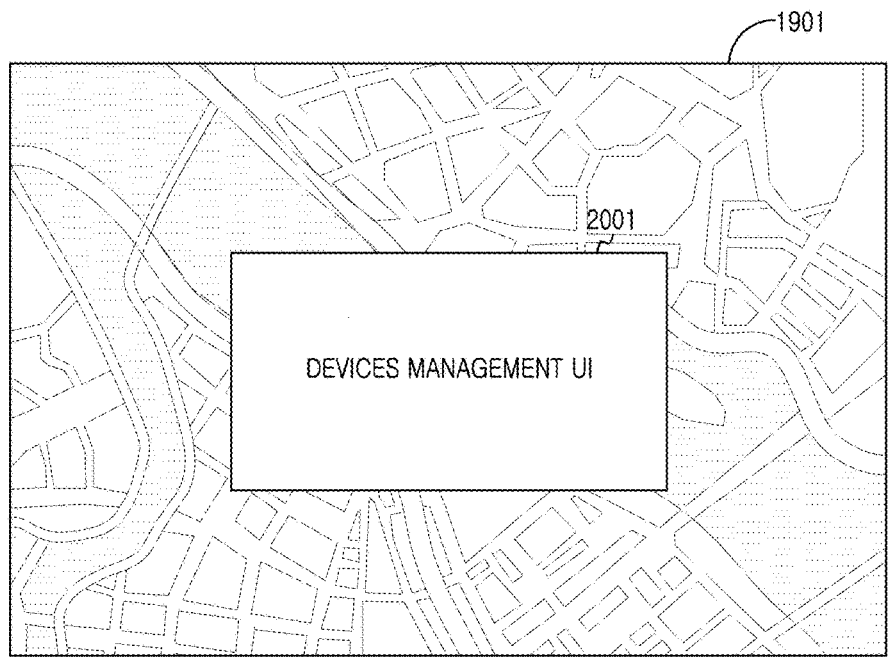
FIG. 20 is a diagram illustrating overlapping of a device management UI in a map recognition mode of an electronic device, according to an embodiment of the present invention.

FIG. 20 is a diagram illustrating overlapping of a device management UI in a map recognition mode of an electronic device, according to an embodiment of the present invention.

A device management UI 2001 provides real-time information about a device and an interface through which a user may manage the device. Referring to FIG. 20, if the user selects at least one of the device recognition results on the electronic map, the electronic device overlaps and displays the device management UI 2001 of FIG. 20 on the video information 1901 of the electronic device, in accordance with the description of FIG. 10 provided above.

Figure 21:
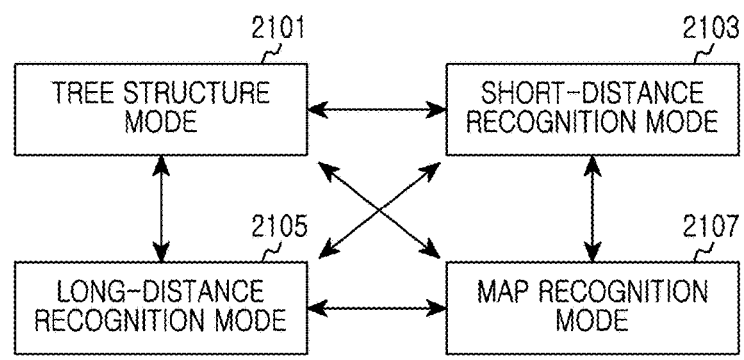
FIG. 21 is a diagram illustrating a mutual compatibility relationship among a tree structure mode, a short-distance recognition mode, a long-distance recognition mode, and a map recognition mode in an electronic device, according to an embodiment of the present invention.

FIG. 21 is a diagram illustrating the mutual compatibility relationship among a tree structure mode, a short-distance recognition mode, a long-distance recognition mode, and a map recognition mode in an electronic device, according to an embodiment of the present invention.

Referring to FIG. 21, a user may select at least one of a tree structure mode 2101, a short-distance recognition mode 2103, a long-distance recognition mode 2105, and a map recognition mode 2107, and recognize and manage a device in the electronic device. The tree structure mode 2101, the short-distance recognition mode 2103, the long-distance recognition mode 2105, and the map recognition mode 2107 are convertible with one another. For example, after selecting the device in the tree structure mode 2101, the user may convert the tree structure mode 2101 into at least one of the short-distance recognition mode 2103, the long-distance recognition mode 2105, and the map recognition mode 2107, and check the device. Also, after selecting a device in the short-distance recognition mode 2103, the user may convert the short-distance recognition mode 2103 into at least one of the tree structure mode 2101, the long-distance recognition mode 2105, and the map recognition mode 2107, and check the device.

Figure 22:
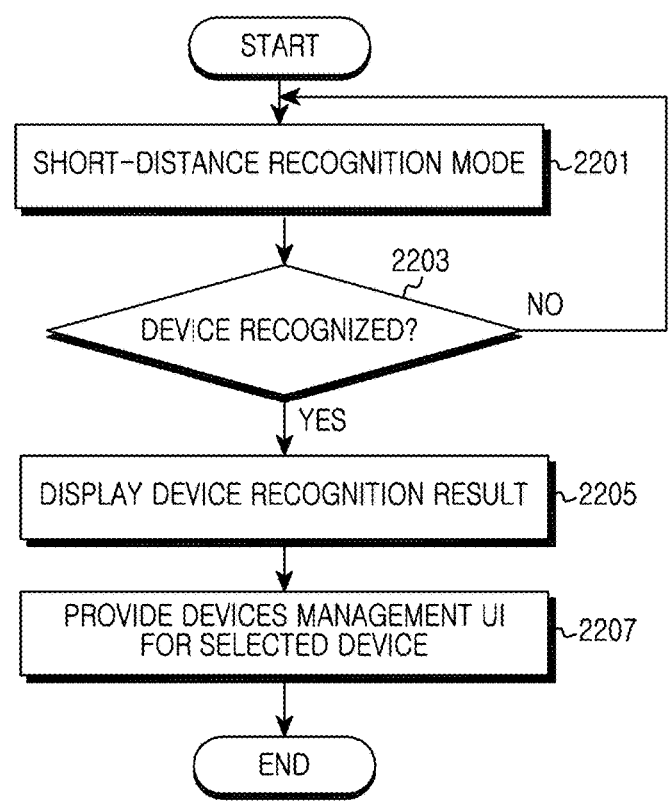
FIG. 22 is a flowchart illustrating an operation procedure of a short-distance recognition mode in an electronic device, according to an embodiment of the present invention.

FIG. 22 is a flowchart illustrating an operation procedure of a short-distance recognition mode in an electronic device, according to an embodiment of the present invention.

The electronic device executes the short-distance recognition mode, in step 2201. The electronic device receives an instruction of execution of at least one of object recognition, text recognition, NFC recognition, and position information recognition from a user.

The electronic device determines whether a device is recognized, in step 2203, in accordance with the description of FIGS. 3-5 and 11-13, provided above.

If a device is recognized, the electronic device displays a device recognition result for the device, in step 220, in accordance with the description of FIGS. 6 and 7 provided above. The electronic device displays the device recognition results on the video information of the electronic device.

If the user selects at least one of the device recognition results, the electronic device provides a device management UI for the selected device, in step 2207, in accordance with the description of FIGS. 9 and 10 provided above.

Figure 23:
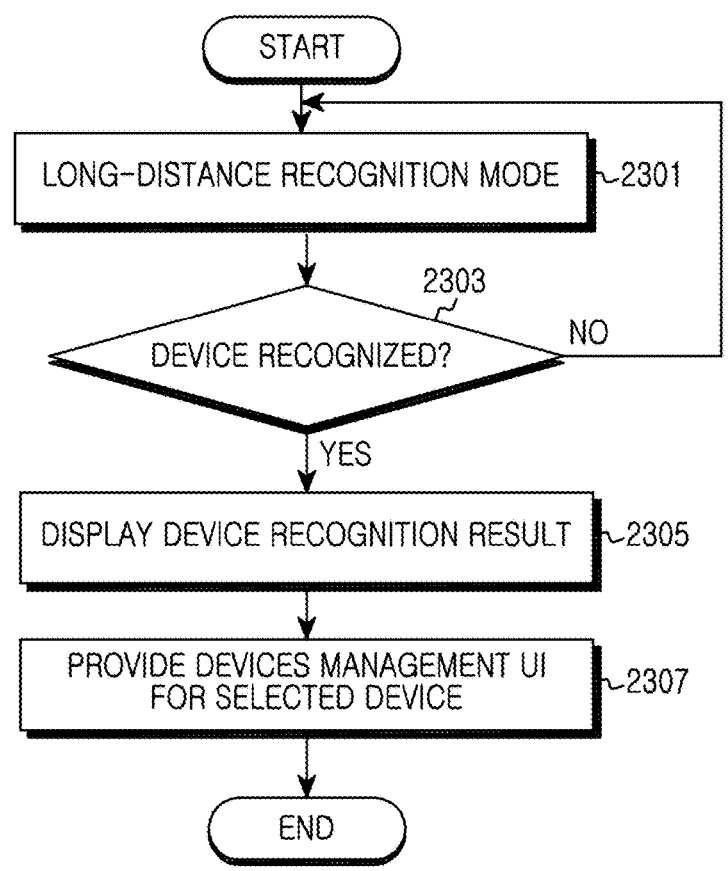
FIG. 23 is a flowchart illustrating an operation procedure of a long-distance recognition mode in an electronic device, according to an embodiment of the present invention.

FIG. 23 is a flowchart illustrating an operation procedure of a long-distance recognition mode in an electronic device, according to an embodiment of the present invention.

The electronic device executes the long-distance recognition mode, in step 2301.

The electronic device determines whether a device is recognized, in step 2303, in accordance with the description of FIGS. 4, 5, 14, 17, and 18 provided above.

If a device is recognized, the electronic device displays a device recognition result for the device, in step 2305, in accordance with the description of FIGS. 7 and 15 provided above.

If the user selects at least one of the device recognition results, the electronic device provides a device management UI for the selected device, in step 2307, in accordance with the description of FIGS. 10 and 16 provided above.

Figure 24:
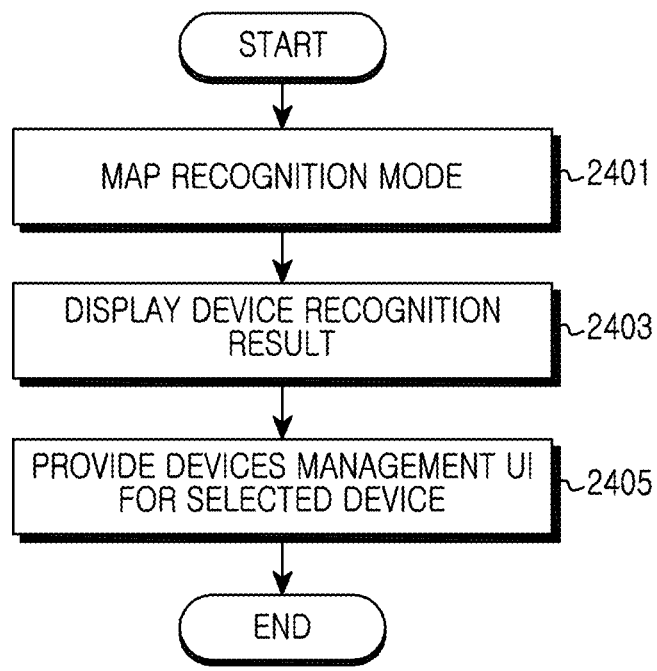
FIG. 24 is a flowchart illustrating an operation procedure of a map recognition mode in an electronic device, according to an embodiment of the present invention.

FIG. 24 is a flowchart illustrating an operation procedure of a map recognition mode in an electronic device, according to an embodiment of the present invention.

The electronic device executes the map recognition mode, in step 2401.

The electronic device displays the device recognition result, in step 2403, in accordance with the description of FIGS. 5, 7, and 19 provided above.

The electronic device provides a device management UI for the selected device, in step 2405, in accordance with the description of FIGS. 10 and 20 provided above.

Figure 25:
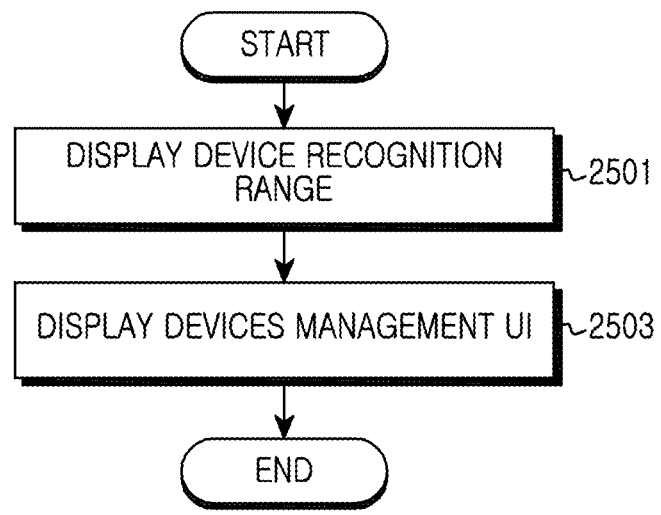
FIG. 25 is a flowchart illustrating an operation procedure of an electronic device, according to an embodiment of the present invention.

FIG. 25 is a flowchart illustrating an operation procedure of an electronic device, according to an embodiment of the present invention.

The electronic device displays a device recognition range on a screen module of the electronic device, in step 2501, in accordance with the description of FIGS. 14 and 15 provided above. The electronic device outputs the device recognition range to the screen module of the electronic device.

If at least one of the device recognition results is selected, the electronic device outputs a device management UI for the selected device to the screen module, in step 2503, in accordance with the description of FIGS. 10 and 16 provided above.

Figure 26:
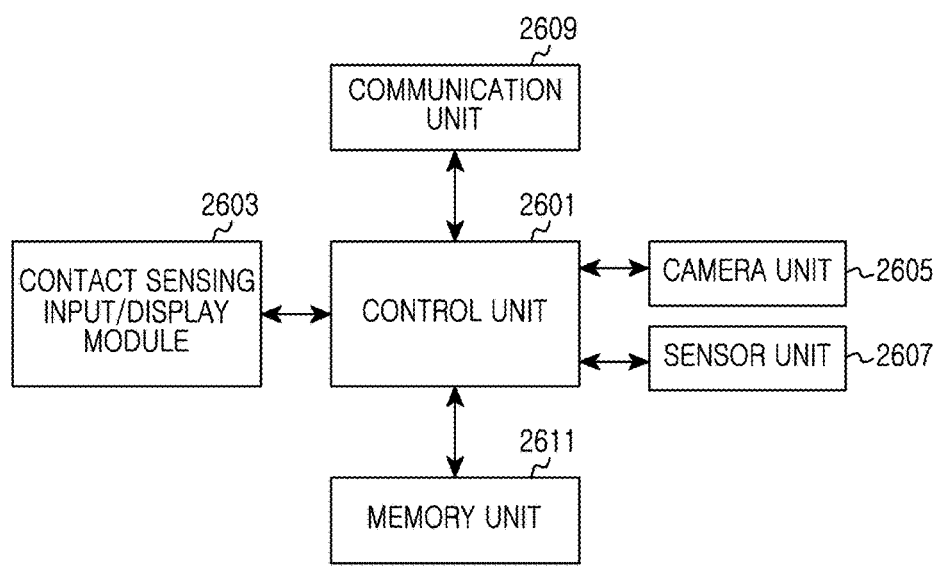
FIG. 26 is a block diagram illustrating an electronic device, according to an embodiment of the present invention.

FIG. 26 is a block diagram illustrating a construction of an electronic device, according to an embodiment of the present invention.

Referring to FIG. 26, the electronic device includes a control unit 2601, a contact sensing input/display module 2603, a camera unit 2605, a sensor unit 2607, a communication unit 2609, and a memory unit 2611.

The control unit 2601 controls the general operation of the electronic device. For example, the control unit 2601 performs processing and control for voice communication and data communication. In addition to a general functions, in accordance with an embodiment of the present invention, the control unit 2601 controls an augmented reality function of synthesizing device information to a camera video based on an AR technology and displaying the synthesis result. The control unit 2601 controls the display of a device located within a preset range on an electronic map based on position information of the camera acquired through the sensor unit 2607. The control unit 2601 controls the display of a screen representing a range to recognized a device, and the display of a device management UI for managing the recognized at least one device. The control unit 2601 controls acquisition of device information through a device management system. The control unit 2601 controls recognition of at least one of an image of a device, a name tag, an AR marker, a QR code, and a bar code in a video acquired through the camera unit 2605, the checking of a device corresponding to at least one of the device image, the name tag, the AR marker, the QR code, and the bar code, and the display of device recognition results on the contact sensing input/display module 2603. If a user selects at least one of the device recognition results, the control unit 2601 controls the display of a device management UI for managing a device corresponding to the user's selection on the contact sensing input/display module 2603. The control unit 2601 controls recognition of at least one of an NFC signal and position information inputted from the user, and the display of the device recognition results on the contact sensing input/display module 2603. If the user selects at least one of the device recognition results, the control unit 2601 controls the display of a devices management UI for managing a device corresponding to the user's selection in the contact sensing input/display module 2603. The control unit 2601 controls recognition of a device located within a shooting range of the camera unit 2605 and a preset distance based on a position of the electronic device and a camera view direction thereof, and controls the setting of a distance range to recognize the device in video information that is being taken by the camera unit 2605. If a device searched by the user is located out of a shooting range of the camera unit 2605 based on the position of the electronic device and the view direction of the camera unit 2605, the control unit 2601 controls the display of the direction of the searched device on the contact sensing input/display module 2603 based on the position of the electronic device. The control unit 2601 controls the display of at least one device recognition result and the display of a device management UI for managing the device on the electronic map.

The contact sensing input/display module 2603 provides an input/output interface between the electronic device and the user. That is, the contact sensing input/display module 2603 provides an interface for a user's touch input/output. Specifically, the contact sensing input/display module 2603 is a medium of delivering a user's touch input to the electronic device, and showing an output of the electronic device to the user. Also, the contact sensing input/display module 2603 provides a visual output to the user. For example, the camera of the electronic device outputs an image of the recognized device. This visual output can be presented in the form of text, a graphic, a video, and a combination thereof. The contact sensing input/display module 2603 can use several display technologies. For example, the contact sensing input/display module 2603 can use a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED) or a Flexible LED (FLED). The contact sensing input/display module 2603 of the present invention is not limited to a touch screen using these display technologies. Also, the contact sensing input/display module 2603 may be divided into a contact sensing input module and a screen module, respectively.

The camera unit 2605 has a camera sensor for converting an optical signal sensed at the time of video shooting into an electrical signal, and a signal processing unit for converting an analog video signal taken from the camera sensor into digital video data. The camera sensor is a Charge Coupled Device (CCD), and the signal processing unit may be implemented as a Digital Signal Processor (DSP).

The sensor unit 2607 may be implemented as one of a GPS receiver, a gyro sensor, a geomagnetic sensor, a gravity sensor, an NFC sensor, or a combination of two or more thereof, and acquires information about a position of the camera unit 2605 and a camera view direction thereof.

The communication unit 2609 performs a function of transmitting/receiving and processing a wireless signal of data inputted/outputted through an antenna. For example, in the case of transmission, the communication unit 2609 performs a function of processing transmission data by channel-coding and spreading, and RF-processing and transmitting the transmission data and, in the case of reception, performs a function of converting a received RF signal into a baseband signal, processing the baseband signal by de-spreading and channel-decoding, and restoring data.

The memory unit 2611 stores a microcode of a program for processing and controlling of the control unit 2601 and various reference data. Particularly, in accordance with an embodiment of the present invention, the memory unit 2611 stores a program for synthesizing device information loaded from the device management system to a camera video based on an AR technology and displaying the synthesis result.

While the invention has been shown and described with reference to certain embodiments thereof, it will be understood by those skilled in the art that various changes in form and detail may be made therein without departing from the spirit and scope of the invention as defined by the appended claims.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

What is claimed is:

1. An electronic device comprising:
    a display;
    a first sensor;
    a transceiver; and
    a processor configured to:
        acquire an image by using the first sensor;
        control the transceiver to receive, from an external device, information including images and positions of a plurality of devices registered to the external device;
        identify at least one device from the image based on the received information of the plurality of devices using at least a selected one of an object recognition, a text recognition, a near field communication recognition and a position information recognition;
        present a menu for selecting a type of the at least one device to filter the selected type of the at least one device;
        control the display to display a first interface comprising at least a part of the information of the filtered type of the at least one device overlaid on a position of the filtered type of the at least one device within the image; and
        control the display, in response to an input on the first interface, to display a second interface for controlling the filtered type of the at least one device.

2. The electronic device of claim 1, wherein the processor is further configured to display a screen showing a range for device recognition.

3. The electronic device of claim 2, wherein the processor is further configured to display one of the image that is being taken through a camera unit of the electronic device and an electronic map.

4. The electronic device of claim 2, wherein the processor is further configured to recognize at least one of an image of a device, a name tag, an augmented reality (AR) marker, a quick response (QR) code, a bar code, an NFC signal, and user position information, from a video acquired through a camera of the electronic device.

5. The electronic device of claim 2, wherein the processor is further configured to control the display to display a screen pause button that freezes the image.

6. The electronic device of claim 2, wherein the image comprises at least one of an identification mode window, an explanatory note distinguishing device states, a radio detection and ranging (RADAR), and a distance adjustment meter.

7. The electronic device of claim 2, wherein the processor is further configured to set a distance range for the device recognition, in the image taken by the camera of the electronic device.

8. The electronic device of claim 2, wherein the processor is further configured to control the display to display the second interface on the electronic map.

9. The electronic device of claim 1, further comprising:
a memory configured to store device information, and
a second sensor configured to acquire information about a position of the electronic device and a camera view direction,
wherein the first sensor comprises a camera configured to acquire the image.

10. The electronic device of claim 9, wherein the second sensor comprises at least one of a global positioning system (GPS) receiver, a gyro sensor, a geomagnetic sensor, a gravity sensor, and a near field communication (NFC) sensor.

11. The electronic device of claim 1,
wherein the processor is further configured to present icons for selecting at least one of the object recognition, the text recognition, the near field communication recognition and the position information recognition.

12. The electronic device of claim 11,
wherein the processor is further configured to recognize the at least one device located within a camera shooting range and a preset distance based on a position of the electronic device and a camera view direction, and
wherein the camera shooting range displays a pole orientation of the electronic device and positions of the at least one device existing within the camera shooting range.

13. The electronic device of claim 12,
wherein the processor is further configured to present, on the second interface, at least one of an upper node and a name of the at least one device, a characteristic icon for checking a characteristic of the at least one device, a manual icon for checking a manual of the at least one device, an instruction icon for inputting an instruction to set the at least one device and specification information of the at least one device.

14. The electronic device of claim 13,
wherein, if a searched device does not exist within the camera shooting range based on the position of the electronic device and the camera view direction, the processor is further configure to control the display to display a direction of the searched device based on a position of the electronic device.

15. A method of operation for an electronic device, the method comprising:
acquiring an image by using a first sensor;
receiving, from an external device, information including images and positions of a plurality of devices registered to the external device;
identifying at least one device from the image based on the received information of the plurality of devices using at least a selected one of an object recognition, a text recognition, a near field communication recognition and a position information recognition;
presenting a menu for selecting a type of the at least one device to filter the selected type of the at least one device;
displaying a first interface comprising at least a part of the information of the filtered type of the at least one device overlaid on a position of the filtered type of the at least one device within the image; and
displaying, in response to an input on the first interface, a second interface for controlling the filtered type of the at least one device.

16. The method of claim 15, further comprising displaying a screen showing a range for device recognition.

17. The method of claim 16, wherein displaying the screen showing the range for device recognition comprises displaying one of the image that is being taken through a camera unit of the electronic device and an electronic map.

18. The method of claim 16, wherein displaying the first interface comprises recognizing at least one of an image of a device, a name tag, an augmented reality (AR) marker, a quick response (QR) code, a bar code, an NFC signal, and user position information.

19. The method of claim 16, wherein the image comprises a screen pause button for freezing the image on the display.

20. The method of claim 16, wherein the image comprises at least one of an identification mode window, an explanatory note distinguishing device states, a radio detection and ranging (RADAR), and a distance adjustment meter.

21. The method of claim 16, wherein displaying the first interface comprises setting a distance range to recognize a device, in the image that is being taken by the camera of the electronic device.

22. The method of claim 16, further comprising:
displaying the second interface on the electronic map.

23. The method of claim 15, further comprising: acquiring information about a position of the electronic device and a camera view direction by using a second sensor,
wherein the first sensor comprises a camera.

24. The method of claim 23, wherein the second sensor comprises at least one of a global positioning system (GPS) receiver, a gyro sensor, a geomagnetic sensor, a gravity sensor, and a near field communication (NFC) sensor.

25. The method of claim 15, further comprising presenting icons for selecting at least one of the object recognition, the text recognition, the near field communication recognition and the position information recognition.

26. The method of claim 25,
wherein identifying the at least one device recognizes the at least one device located within a camera shooting range and a preset distance based on a position of the electronic device and a camera view direction, and
wherein the camera shooting range displays a pole orientation of the electronic device and positions of the at least one device existing within the camera shooting range.

27. The method of claim 26,
wherein the second interface further presents at least one of an upper node and a name of the at least one device, a characteristic icon for checking a characteristic of the at least one device, a manual icon for checking a manual of the at least one device, an instruction icon for inputting an instruction to set the at least one device and specification information of the at least one device.

28. The method of claim 27, further comprising, if a searched device does not exist within the camera shooting range on a basis of the position of the electronic device and the camera view direction, displaying a direction of the searched device based on a position of the electronic device.

* * * * *